United States Patent

[11] 3,558,122

| [72] | Inventor | Robert A. Jaross<br>Sandwich, Ill. |
|---|---|---|
| [21] | Appl. No. | 827,842 |
| [22] | Filed | May 26, 1969 |
| [45] | Patented | Jan. 26, 1971 |
| [73] | Assignee | the United States of America as represented by the United States Atomic Energy Commission |

[54] LIQUID METAL PURIFIER
5 Claims, 3 Drawing Figs.

[52] U.S. Cl............................................. 266/37,
165/96, 165/106, 165/119, 165/160
[51] Int. Cl. .................................................. C22b 9/02
[50] Field of Search.......................................... 266/37, 34;
165/106, 119; 75/66

[56] References Cited
UNITED STATES PATENTS

| 1,117,444 | 11/1914 | Robinson ...................... | 165/106 |
| 2,737,779 | 3/1956 | Lawrence...................... | 62/383 |
| 2,893,706 | 7/1959 | Smith ........................... | 165/106 |
| 2,969,970 | 1/1961 | Schomer ....................... | 266/37 |

Primary Examiner—Gerald A. Dost
Attorney—Roland A. Anderson

ABSTRACT: A device for removing oxides from liquid metals consists of a vertically disposed, double-walled tube, an outer shell concentric with and surrounding the double-walled tube, a heat exchanger at the top of the device, a metal oxide collector at the lower end of the device, and a double-walled thermal barrier movable alongside of the metal oxide collector. The device is mounted in the top of a tank containing the liquid metal with the metal oxide collector immersed in the liquid metal. A heat exchange fluid flows upwardly in the double-walled tube, through the heat exchanger, and downwardly in the annulus between the double-walled tube and the outer shell, thereby cooling the metal oxide collector. Metal oxide precipitates on the metal oxide collector and is prevented from redissolving in the liquid metal by moving the thermal barrier to cover part of the metal oxide collector.

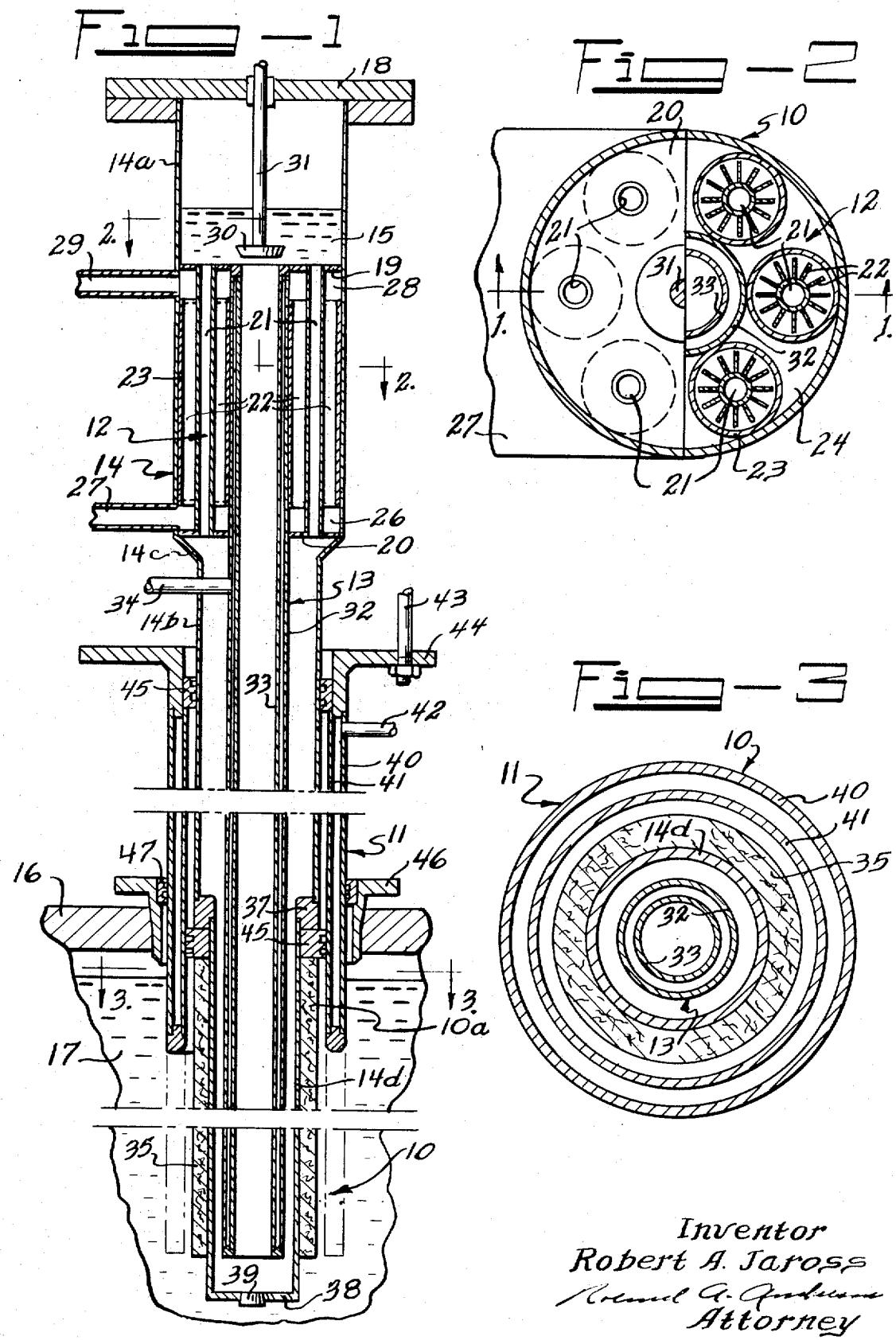

3,558,122

LIQUID METAL PURIFIER

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a liquid metal purifier and more particularly to a device for removing metal oxides from liquid metals. In still more detail, the invention relates to a sodium oxide trap wherein the sodium oxide is positively prevented from redissolving in the liquid sodium.

Liquid metals are today widely used as heat transfer media. For example, the use of sodium as coolant in nuclear reactors is well established. With use, oxides of the liquid metal always form in the liquid metal due to contamination with atmospheric oxygen or reaction with objects in contact with the liquid metal. These oxides must be removed, since they contribute to accelerated corrosion of materials of construction and they tend to obstruct flow passages. They are normally removed in a cold trap which makes use of the fact that the solubility of these oxides is a direct function of temperature. The oxides may thus be removed by lowering the temperature of the liquid metal to a temperature below the precipitation point of the liquid metal oxide and filtering off or entrapping the precipitated oxides. One difficulty with such devices heretofore known is that a complex and costly auxiliary piping system is necessary to circulate sodium through a precipitating tank. This present invention eliminates this piping system and performs the purification of the liquid metal entirely inside the main liquid metal system. By locating the entire purification system in a single unit its removal and replacement is facilitated. Also, it would require no special shielding while operating in a radioactive system.

Redissolution of the metal oxide is prevented by the progressive repositioning of a thermal barrier over the metal oxide collector as oxides are trapped at the leading end of the thermal barrier.

SUMMARY OF THE INVENTION

This and other objects of the invention are attained by a device for removing oxides from liquid metals comprising a metal oxide collector adapted to be immersed in a body of the liquid metal, a heat exchanger outside the body of liquid metal, means for transferring heat from the metal oxide collector to the heat exchanger, and a movable thermal barrier positioned around the metal oxide collector.

BRIEF DESCRIPTION OF THE DRAWING

The invention will next be described in connection with the accompanying drawing wherein:

FIG. 1 is a vertical cross section of a liquid metal purifier constructed in accordance with the present invention taken on the line 1–1 in FIG. 2;

FIG. 2 is a horizontal cross section thereof taken on the line 2–2 in FIG. 1; and FIG. 3 is a horizontal cross section thereof taken on the line 3–3 in FIG. 1.

DESCRIPTION OF THE PREFERRED EMBODIMENT

The discussion hereinafter will be restricted to an embodiment of the invention useful for removing sodium oxide from sodium, although the invention is not so limited. The invention can be applied to the removal of oxides or other impurity metal compounds from any metal where the metal compound precipitates from the metal at a suitable temperature.

The invention will first be described in general terms with reference to the drawing and then the specific embodiment of the invention disclosed will be described in detail. The device consists essentially of a sodium oxide collector 10 provided with a movable thermal barrier 11 exterior thereto, a heat exchanger 12 and means for transferring heat from the sodium oxide collector to the heat exchanger consisting of a fixed double-walled tube 13, an outer shell 14 concentric with and surrounding double-walled tube 13, and a heat exchange fluid 15 circulating upwardly in the double-walled tube and downwardly in the annulus between the double-walled tube and the outer shell 14. The device is adapted to be disposed in a vertical position in a tank 16 containing a pool 17 of liquid sodium with sodium oxide collector 10 being submerged in the sodium and heat exchanger 12 being above the top of the tank.

Operation of the device will be apparent from this very brief description thereof. A heat exchange fluid — which may be and preferably is NaK, an alloy containing varying amounts by weight of sodium and potassium — cools sodium oxide collector 10 and is in turn cooled in heat exchanger 12. This causes sodium oxide to precipitate out of the liquid sodium in tank 16 and deposit on the cooled surfaces in zone 10a of the sodium oxide collector 10 which is under the end of the thermal barrier 11. Movement of thermal barrier 11 downwardly so that it covers more of the surface of sodium oxide collector 10 provides a new portion of the sodium oxide collector for the collection of oxides and positively prevents the sodium oxide from redissolving in the liquid sodium.

The liquid sodium purifier according to the present invention will next be described in detail. The primary structural element of the device is outer shell 14 which includes an upper enlarged portion 14a, a middle portion 14b of reduced diameter connected by a transition section 14c to portion 14a and a lower portion 14d of further reduced diameter. It is closed at the top by cover 18 and extends a substantial distance above the top of double-walled tube 13. Heat exchanger 12 is disposed in the annulus between outer shell 14 and double-walled tube 13. It includes a pair of annular plates 19 and 20 extending between outer shell 14 and double-walled tube 13 which are disposed, respectively, at the top of double-walled tube 13 and at the bottom of enlarged portion 14a of outer shell 14 and which serve as tube sheets for six tubes 21 having radial fins 22 attached thereto which are disposed in a ring around double-walled tube 13. It will be noted that radial fins 22 are shorter than are tubes 21. Surrounding tubes 21 and fins 22 and of the same length as fins 22 are cylindrical air passage enclosures 23, while flat pieces 24 are provided joining enclosures 23 at the top and bottom thereof, creating a dead air space therebetween. Annular plate 20 and pieces 24 at the bottom of air passage enclosures 23 define an air inlet plenum 26 with which air inlet 27 communicates and annular plate 19 and pieces 24 at the top of air passage enclosures 23 define an air outlet plenum 28 with which air outlet 29 communicates. Thus air blown into air inlet plenum 26 will flow past tubes 21 over fins 22 countercurrent to the flow of NaK through tubes 21. Also shown is valve 30 operated by rod 31 passing through cover 18 which may be used to control the flow of NaK through the heat exchanger.

Double-walled tube 13 consists of an outer wall 32 spaced from an inner wall 33 and joined at top and bottom. A vacuum line 34 communicates with the space between outer wall 32 and inner wall 33. Thus double-walled tube 13 constitutes a thermal shield preventing the cooled downflowing NaK in the annulus between double-walled tube 13 and outer shell 14 from picking up heat from the heated upflowing NaK within the double-walled tube 13.

Sodium oxide collector 10 consists of a coarse stainless steel wire mesh 35 which is supported by portion 14d of shell 14. Support portion 14d has a diameter slightly less than that of portion 14b of shell 14 from which it is supported by ring 37. The outer diameter of wire mesh 35 is equal to that of portion 14b of shell 14. Support portion 14d extends a little lower than does wire mesh 35 and double-walled tube 13 and is provided with an end piece 38 containing a drain 39.

The movable thermal barrier 11 next to be described constitutes an important feature of the present invention. Thermal barrier 11 consists of an outer wall 40 spaced from an inner wall 41 and joined at top and bottom. A vacuum line 42 communicates with the space between the outer wall 40 and inner wall 41. The thermal barrier 11 depends from and may be moved by lifting rods 43 attached to a lifting plate 44. Movable thermal barrier 11 is spaced from the outer shell 14 and wire mesh 35 by sodium vapor seals 45. Movable thermal barrier 11 fits inside of nozzle 46 in tank 16 and is spaced therefrom in movable relationship therewith by sodium vapor seal 47. It will be appreciated that in view of this the entire device must be supported from the cover 18.

It will be appreciated that the drawing does not give a true indication of the scale of the device, since it may be about 20 feet long by 4 or 5 inches in diameter. Wire mesh 35 may be about 5 feet in length.

In operation, a heater (not shown) in double-walled tube 13 may be used to start the circulation of the heat exchange fluid 15. Movable thermal barrier 11 is in the raised position as in FIG. 1 where it covers only a few inches of the wire mesh 35. Heat exchange fluid 15 gives up its heat to air blown through heat exchanger 12 and in turn cools wire mesh 35 in sodium oxide collector 10a. Only a small portion of the wire mesh 35, near the end of the movable thermal barrier 11, at 10a is active in collecting precipitated sodium oxide, since the exposed mesh outside the thermal barrier is too high in temperature to be effective. As sections of the wire mesh just outside the thermal barrier become saturated with sodium oxide, the thermal barrier is moved downwardly to cover them. By maintaining its temperature low, this protects the sodium oxide precipitated on the already utilized mesh from dissolving back into the bulk sodium. Without the thermal barrier, dissolution of the sodium oxide would occur with any failure of the coolant system. However, with the thermal barrier in place, the rate of dissolution of sodium oxide back into the bulk sodium is greatly slowed.

When operating in a 700°F. bulk sodium tank whose sodium oxide saturation temperature is 350° F., the NaK leaving the heat exchanger is in the range between 225 and 325° F. This is achieved by control of NaK flow and/or air flow. The insulated, cold NaK flows downward past the protected mesh region toward the lower end of the movable thermal barrier. As it approaches the end of the barrier it will pick up heat form the from the bulk sodium so that within a short distance, at the end of the barrier, its temperature will rise to 700°F.

The NaK flows downward, no longer cooling the mesh, makes a turn at the bottom of the device, and flows upward to the top. Making a turn at the top, it will be cooled to 225° to 325° F. in the heat exchanger and commence the cycle again. Flow is provided by the thermal head developed in the long vertical lengths of tubing.

It will be understood that the invention is not to be limited to the details given herein but that it may be modified within the scope of the appended claims.

I claim:

1. A device for removing oxides from liquid metals comprising a metal oxide collector adapted to be immersed in a body of the liquid metal, a heat exchanger outside the body of liquid metal, means for transferring heat from the metal oxide collector to the heat exchanger, and a movable thermal barrier positioned around the metal oxide collector.

2. A device according to claim 1 wherein said metal oxide collector comprises a wire mesh mounted on the outside of a cylindrical support tube.

3. A device according to claim 2 wherein said movable thermal barrier comprises a double-walled tube having a vacuum between the walls, and includes means for moving said double-walled tube along said wire mesh to cover greater portions of said wire mesh.

4. A device according to claim 3 wherein said means for transferring heat from said liquid-metal-oxide collector to said heat exchanger comprises an elongated double-walled tube having a vacuum between the walls, an outer shell concentric with and surrounding said double-walled tube, and a heat exchange fluid circulating upwardly in the double-walled tube and downwardly in the annulus between the double-walled tube and the outer shell.

5. A device according to claim 4 wherein said heat exchanger comprises a pair of annular plates extending between the double-walled tube and the outer shell, a plurality of tubes extending between said annular plates, each of said tubes having a plurality of radial fins attached thereto, said fins being shorter than the tubes, cylindrical air passage enclosures surrounding said finned tubes and of the same length as the fins, flat pieces joining the air passage enclosures at the top and bottom thereof, thereby creating a dead air space between the air passage enclosures and establishing an air inlet and an air outlet plenum at the ends of the finned tubes, and an air inlet and outlet into said plenums.